May 19, 1959
J. E. KRUKEMEIER
2,887,094
WATER SUPPLY ACTUATED MEDICINAL ADDITIVE
PROPORTIONING DEVICE
Filed July 5, 1957
4 Sheets-Sheet 2
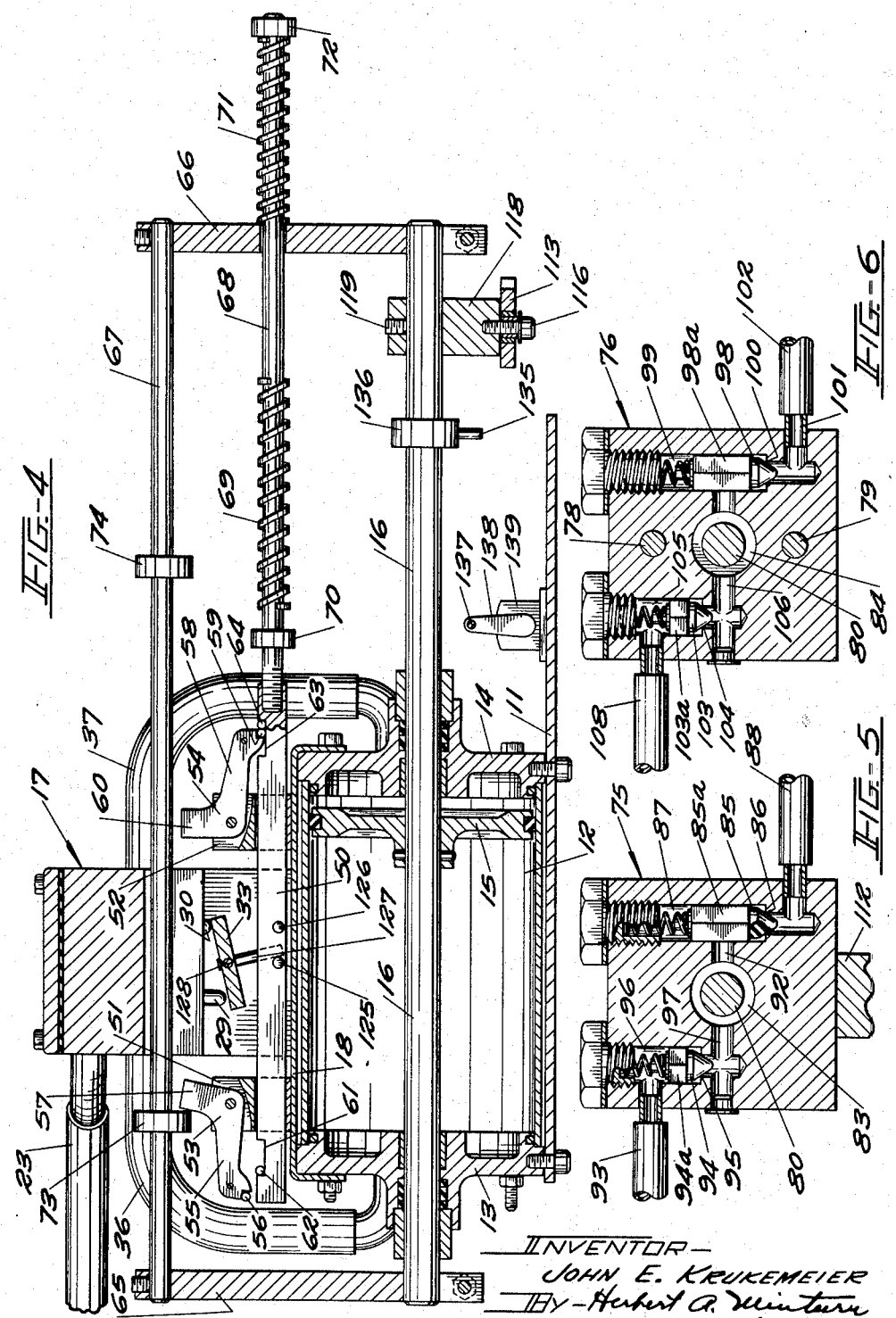
INVENTOR—
JOHN E. KRUKEMEIER
By—Herbert A. Winterer
ATTORNEY

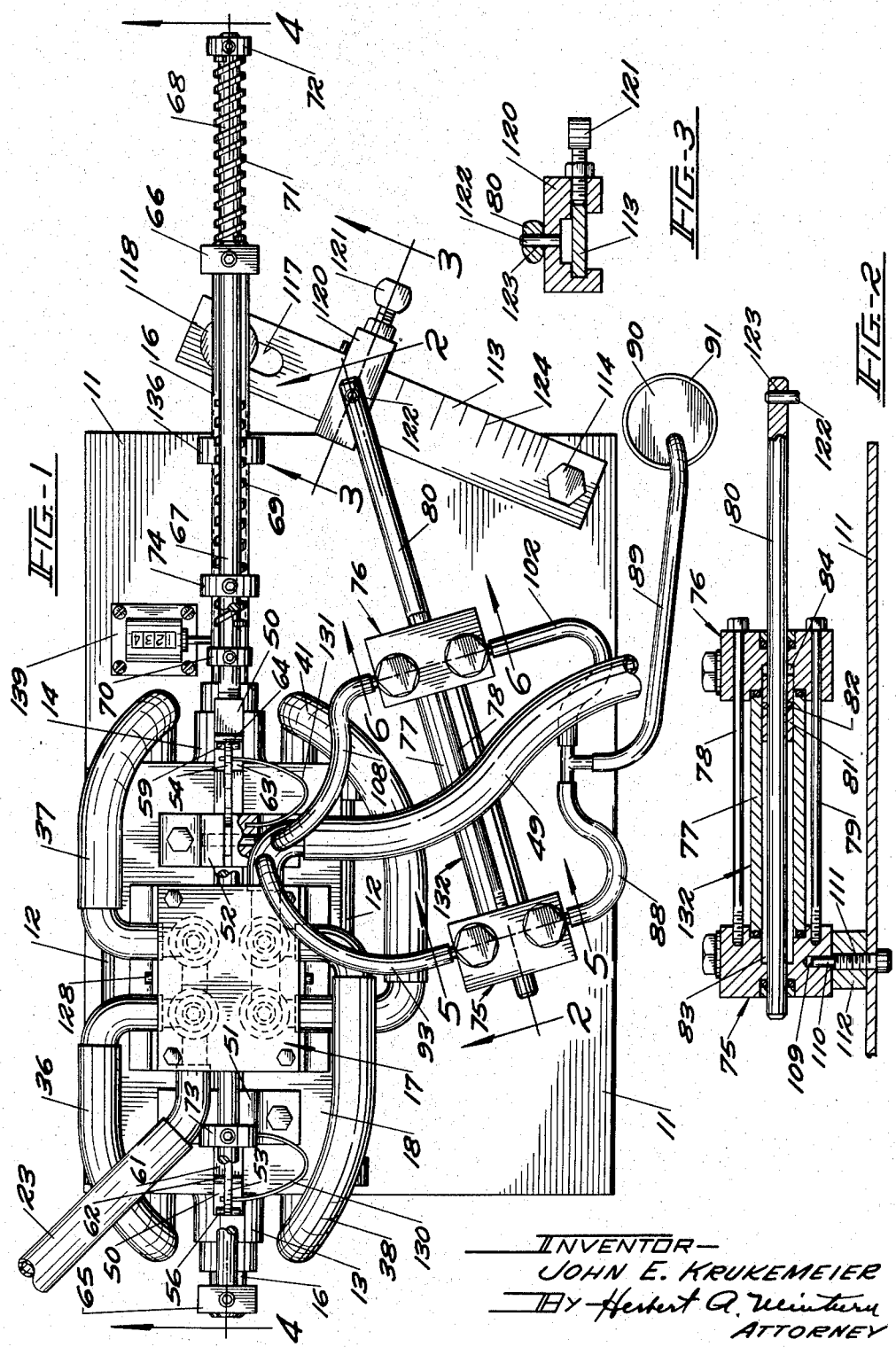

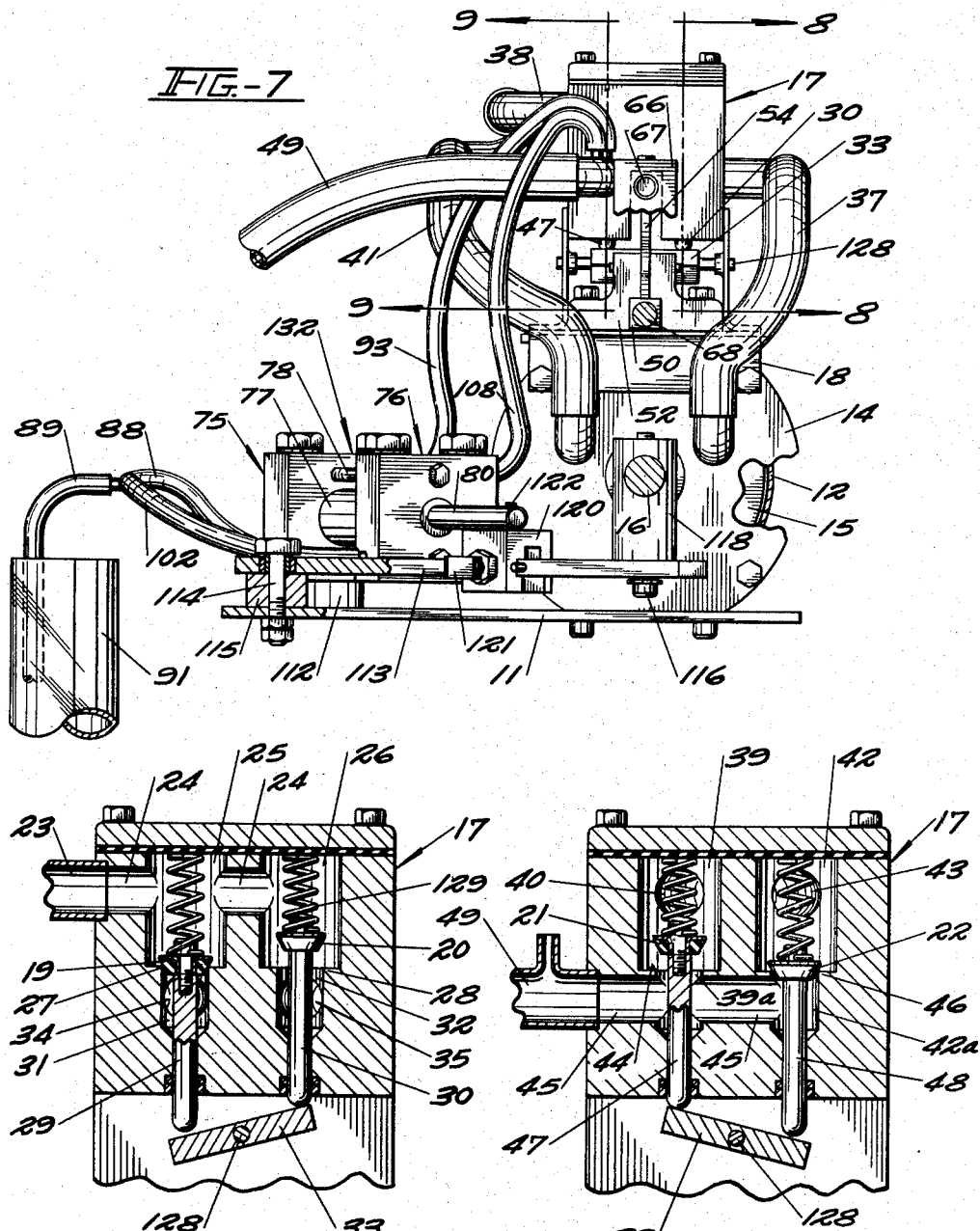

May 19, 1959
J. E. KRUKEMEIER
2,887,094
WATER SUPPLY ACTUATED MEDICINAL ADDITIVE
PROPORTIONING DEVICE
Filed July 5, 1957
4 Sheets-Sheet 4
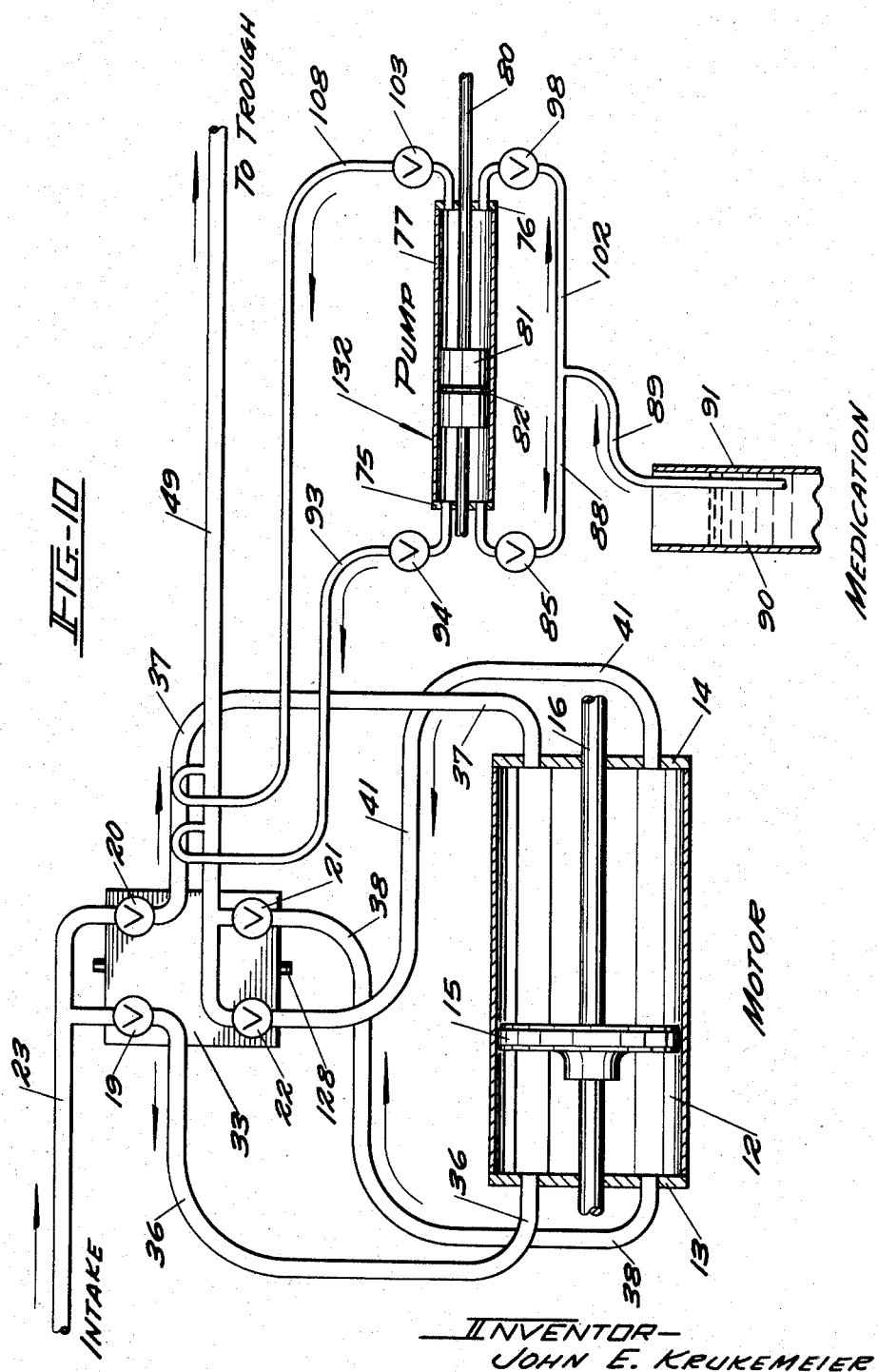
INVENTOR—
JOHN E. KRUKEMEIER
By Herbert A. Winture
ATTORNEY United States Patent Office 2,887,094
Patented May 19, 1959

2,887,094
WATER SUPPLY ACTUATED MEDICINAL ADDITIVE PROPORTIONING DEVICE

John E. Krukemeier, Beech Grove, Ind.

Application July 5, 1957, Serial No. 670,328

3 Claims. (Cl. 121—164)

This invention relates to a device having for its primary purpose the use of a pressurized water supply to chickens or livestock as the case may be wherein that water supply is employed to actuate a medicinal additive proportioning device to the end that a precise proportion of the medicinal material is added to a definite volume of water in order that there will not be an excess or a deficiency of the intended medication of the water.

A second primary object of the invention, which is most important, is that, should for any reason, the motive parts of the device fail and stop operating, and stop supplying the medicinal preparation, the water supply will not be interrupted but will continue to flow to the watering tank or trough for the chickens or animal consumption.

Further important objects and advantages of the invention reside in the unique association of the various elements promoting not only long life, but also the utmost reliability whereby the entire device will continue operating automatically indefinitely, with the only operation to be added being that of replenishing the supply of the medicinal preparation.

The invention contemplates the use of a particular, specific construction of a water motor actuating in timed sequence a piston type pump for feeding the medicinal preparation into the water discharge line leading from the water motor, all in a manner flowing from sound mechanical interrelationships between the various elements.

The foregoing and many other objects and advantages of the invention will become more apparent to those versed in the art in the following description of one particular form of the invention as illustrated in the accompanying drawings, in which Fig. 1 is a view in top plan of a structure embodying the invention;

Fig. 2 is a view in vertical section on the line 2—2 through the medicinal pump;

Fig. 3 is a detail in vertical section on the line 3—3 in Fig. 1;

Fig. 4 is a view in central vertical section through the actuating motor on the line 4—4 in Fig. 1;

Fig. 5 is a transverse view through the medicinal preparation pump valve chest on the line 5—5 in Fig. 1;

Fig. 6 is a vertical section on the line 6—6 through a second valve chest on the medicinal preparation pump, in Fig. 1;

Fig. 7 is a view in end elevation of the device in partial section;

Fig. 8 is a view in vertical section through the motor valve chest on the line 8—8 in Fig. 7;

Fig. 9 is a vertical section through another portion of the motor valve chest on the line 9—9 in Fig. 7; and Fig. 10 is a diagrammatic illustration of the flow of the liquid through the device.

Upon any suitable base member 11 there is mounted a water motor cylinder 12 having the opposing heads 13 and 14 compressibly and sealably engaging over opposite ends of the cylinder 12. Within the cylinder 12 there is placed a piston 15 fixed on a piston rod 16 which is slidingly and sealably guided through the heads 13 and 14 to have end portions always extending outwardly and therebeyond.

A valve chest generally designated by the numeral 17 is mounted in the present form on the topside of the cylinder 12 on a suitable base member 18 fixed to the respective cylinder heads 13 and 14.

Four tappet valves 19, 20 and 21, 22 are vertically reciprocated in pairs in the valve chest 17, Figs. 8 and 9. Referring first to Fig. 8, there is a water supply intake pipe 23 entering the chest 17 and communicating with a cylindrical transverse bore 24, in turn communicating with two vertically disposed cylindrical valve chambers 25 and 26 respectively. The valve 19 seats on a shoulder 27 at the lower end of the chamber 25 and the valve 20 seats on a shoulder 28 (open in the present position) at the lower end of the chamber 26. Valve stems 29 and 30 extend from the valves 19 and 20 respectively downwardly through discharge chambers 31 and 32 and extend below the valve chest 17 into the path of the valve actuating rocker plate 33. The chambers 31 and 32 are ported as at 34 and 35 into the outlet pipes 36 and 37 respectively. These pipes 36 and 37 open into the cylinder 12 through the heads 13 and 14, that is on opposite sides of the piston 15.

Referring now to Fig. 9, a pipe 38 (as shown in Fig. 1) leads from the cylinder 12 through the head 13 into a valve chamber 39 through the port 40. A pipe 41 (shown in Fig. 1) leads from the cylinder 12 through the head 14 and to the valve chamber 42 in the chest 17, through the port 43.

The valve 21 is in the chamber 39, and seats on a shoulder 44 at the bottom of that chamber, about an opening 39a leading into a transverse discharge chamber 45.

The valve 22 seats on a shoulder 46 in the valve chamber 42, this shoulder 46 being about an opening 42a into the discharge chamber 45. Stems 47 and 48 lead downwardly respectively from the valves 21 and 22 through the chamber 45 and extend outwardly from the chest 17 to be in the path of the rocker plate 33. The chamber 45 communicates to a discharge pipe 49. This discharge pipe 49 leads to the watering zone for the chickens or livestock, such as to a trough (not shown).

A valve operating slide bar 50, Fig. 4, extends longitudinally across the member 18 slidably guided through brackets 51 and 52. Bell crank rockers 53 and 54 are rockably carried respectively by the brackets 51 and 52. The rocker 53 has a generally horizontally disposed arm 55 which carries transversely thereacross at its lower outermost end a rod or roller 56 fixed thereto. The rocker 53 also has a generally upturned leg 57.

Likewise the rocker 54 has a generally horizontally disposed leg 58 at the lower outermost corner of which is transversely disposed a cylindrical rod roller 59 fixed to the leg 58. The rocker 54 also has an upturned leg 60.

On the topside of the slide bar 50 there is a recess 61, at the outer end portion of which is fixed a transversely disposed length of a cylindrical rod 62. This recess is disposed at the outer end portion of the bar 50, the left hand end as viewed in Fig. 4.

There is a recess 63 across the topside of the bar 50 spaced to the right of the bracket 52 in the position of the bar 50 as indicated in Fig. 4, and at the outer end of this recess there is fixed transversely thereacross a length of a cylindrical rod 64.

Bars 65 and 66 are respectively fixed to outer end portions of the piston rod 16, Fig. 4. These bars 65 and 66 extend upwardly, and have fixed in their upper end portions a rod 67 extending therebetween in substantially parallel relation with the piston rod 16, and at a distance above the slide bar 50. The slide bar 50 in the form herein shown, extends outwardly and slidingly through the bar 66 by an extension rod 68 fixed to the end of the slide bar 50.

A coil spring 69 loosely surrounds the rod 68 between the bar 66 and the adjustable abutment collar 70 through which the rod 68 extends. The spring 69 is free to shift along the rod 68 between that abutment 70 and the bar 66 when the piston 15 is in the right hand position in the cylinder 12 as indicated in Fig. 4. A second coil spring 71 surrounds the rod 68 on a length thereof which extends outwardly beyond the bar 66, to be between that bar 66 and an abutment 72 fixed to the outer end portion of the rod 68. The spring 71 is likewise free on the rod 68, but is compressed therealong by the bar 66 urging the spring 71 toward the abutment 72 when the piston 15 travels to the right hand end of the cylinder 12. The spring 71 is shown in its compressed condition whereas the spring 69 is in its free length condition.

The upper rod 67 carries a pair of collars 73 and 74 adjustably positioned along the rod 67. These collars 73 and 74 are always positioned to have the legs 57 and 60 of the rockers 53 and 54 therebetween and supply the means for rocking the members 53 and 54 upon suitable travel of the piston 15 which will later be explained.

The description so far made relates to the water supply driven motor which is employed to actuate the over-all device. Attention is now directed to the pump for feeding the medication into the water discharging from the structure as has been described. A pair of pump valve heads designated generally by the numerals 75 and 76 compressibly engage therebetween a cylinder 77 by means of bolts 78 and 79 passing through the valve head 76 and screw-threadedly engaging the valve head 75 to sealably interconnect the cylinder 77 therebetween in a compressive manner.

A piston rod 80 slidingly and sealably passes through both the valve heads 75 and 76, and carries a piston 81 within the cylinder 77, this piston 81 having a generally tubular shape with a central sealing ring 82 bearing between it and the internal wall of the cylinder 77. It is to be noted that each of the valve heads 75 and 76 carries a bore 83 and 84 of the same diameter as that internally of the cylinder 77 so as to receive respective ends of the piston 81 therein as a means for dispelling any air which might otherwise initially remain between the respective ends of the piston and the valve heads upon initial set up of feeding of the device. That is, by pushing the piston rod 80 to one end, the piston 81 will come to the end of the bore 83 for example, and by pulling it to the other end, the piston 81 will come to the end of the bore 84 so that air at either end may be fully expelled.

The two valve heads 75 and 76 are illlustrated respectively in cross-sectional views in Figs. 5 and 6.

Within the valve head 75, there is a poppet valve 85 herein shown as being of conical formation seating on the shoulder 86 at the bottom of a valve chamber 87. The valve chamber 87 opens into a pipe 88 which leads to a pipe 89 submerged by an end in a supply of the medicinal composition 90 in any suitable receptacle such as a flask 91. The valve 85 seating on the shoulder 86 normally closes off communication between the pipe 88 and a passageway 92 which opens into the bore 83.

The valve 85 has a stem 85a which may be fluted or, as herein shown, square in cross-section to allow flow of fluid past the valve 85 and the stem 85a.

In the same valve head 75, there is a poppet valve 94 seating on a shoulder 95 at the lower end of a valve chamber 96 from which a passageway 97 leads to open into the bore 83. The chamber 96 above the valve 94 opens into a pipe 93 which leads to and discharges into the water discharge pipe 49. Referring to Fig. 6, and to the other valve head 76, there is a like arrangement of valves. A poppet valve 98 in a valve chamber 99 seats normally on a shoulder 100 at the lower end of the chamber 99, closing off an opening into a transverse passageway 101 which leads to a pipe 102. The valve chamber 99 opens into the bore 84. The pipe 102 connects with the pipe 89. A second poppet valve 103 with a square stem 103a normally seats on the shoulder 104 at the bottom end of a valve chamber 105 which in turn communicates above the valve 103 with the pipe 108 which discharges into the water discharge pipe 49. The chamber 105 connects past the valve 103 through the passageway 106 with the bore 84.

The valve head 75 has a vertically entering bore 109 entering from its underside to receive therein a pin 110 carried on the upper end of a bolt 111 which extends upwardly from the base 11 through a pedestal block 112. The valve head 75 is rockably fitted in this manner over the pin 110. There is mounted a rocker bar or arm 113 on the base 11, Fig. 7, by means of a through bolt 114 passing downwardly through the arm 113, a pedestal block 115 and the base 11. This arm 113 extends from its pivot bolt 114 to have its free end under the piston rod 16 where it receives a cap screw 116 passed upwardly through a slot, Fig. 1, 117 in the arm 113 and screw-threadedly engages in the block 118 which may be adjustably attached to the piston rod 16 at the required position therealong by having the rod 16 pass through the block 118 and a set screw 119 passing through the block to bear against the rod 16, Fig. 4.

A slide 120 is carried on the arm 113 to be shiftable longitudinally thereof and secured in any desired position by means of a thumb screw 121, Fig. 3. The end of the piston rod 80 is removably attached to the slide 120 by dropping the end of the piston rod 80 down over a pin 122 which is fixed in a slide 120 and enters through a bore 123 in the piston rod 80 so that the rod 80 may be lifted vertically from the pin 122 as may be desired. Preferably the upper side of the arm 113 is graduated by marks 124 for location of the slide 120 therealong as will be later described.

Operation

Assuming the piston 15 to be in the position as indicated in Fig. 4, and that there is a supply of water under pressure connected with the pipe 23, water will enter into the passageway 24, Fig. 8, and out past the open valve 20 through the pipe 37 into the cylinder 12 and tend to move the piston 15 toward the left of the cylinder. In so doing, water to the left of the piston 15 will be exhausted through the pipe 38, the valve 21, and out through the pipe 49.

As the piston 15 travels to the left, the rod 67 is carried at the same rate of travel to the left, and the collar 74 is so fixed on that rod 67 that when the piston 15 approaches the head 13, the collar 74 will abut the leg 60 of the rocker 54 tending to rock it about its pivot connection with the bracket 52. During the travel of the piston rod 16 to the left, the bar 66 will have come into contact with the right hand end of the spring 69, compressing it against the abutting collar 70 in turn applying a pressure between the rollers or rods 59 and 64. As shown in Fig. 1, a pair of U-shaped flat springs 130 and 131 extend between the respective brackets 51 and 52 and their respective horizontal rocker arms 55 and 58, thus tending to exert constant downward pressure by each roller or rod 56 and 59 against the bar 50.

These rods 59 and 64 are so presented one in respect to the other that there is a tangential line contact substantially on the horizontal central diameter plane of each. When the travel of the piston 15 has carried the collar 74 into contact with leg 60, and continued travel is had, the rocker 54 is rocked by pressure on the leg 60, to cause the roller 59 to jump upwardly over the rod 64 under the pressure of the spring 69 which in turn kicks the slide bar 50 to the left and allows the rod 56 to drop into the recess 61 behind the rod 62.

On the slide bar 50 is a pair of spaced apart pins 125 and 126 between which there extends at least one post or finger 127 from the plate 33. This plate 33 is rockably supported on a horizontally disposed shaft 128, and when the pin 126 pushes the post 127 from its position indicated in Fig. 4 to the left hand sloping position, the rocker plate 33 will have pushed the stem 29 upwardly and opened the valve 19 whereas the stem 30 of the valve 20 will be released to allow its spring 129 to kick it downwardly to a closed position. In so doing, the valve 20 cuts off the flow of the water under pressure to the right hand side of the piston 15 and the valve 19 is opened to permit water to exhaust through the pipe 41, through the valve 22 to the pipe 49.

Also the valve 19 will have been opened to permit water to flow through it, and the pipe 36 to the left side of the piston 15, driving the piston to the right to exhaust the water as indicated. Thus the piston rod 16 travels to the right to eventually compress the spring 71, setting up pressure between the members 56 and 62 and eventually have the member 56 jump up as the rocker 53 is rocked by the collar 73 to, in turn, allow the spring 71 to kick the bar 50 to the right and reverse the valve action.

With the motor operating as has just been described, the piston 81 in the cylinder 77 will be correspondingly operated in relation to the travel of the piston 15 in the cylinder 12. The degree of output of the pump generally designated by the numeral 132 will be varied in accordance with the position of the slide 120 along the bar 113. The reciprocation of the piston rod 16 causes a corresponding rocking of the bar 113, and the length of travel of the piston rod 80 will vary in accordance with the location of the slide 120 as indicated. The maximum output of the pump 132 will be had when the slide 120 is nearest the block 118 and will be at its minimum when the slide 120 is adjacent the pivot bolt 114.

Thus when the arm 113 is being rocked to and fro under the travel of the piston rod 16 of the motor, the following action will be had in the pump 132.

When the piston 81 travels to the right of the cylinder 77, Fig. 2, the valve 85, Fig. 5, will be lifted in view of the vacuum created in the chamber 87, and the fluid medication 90 will be drawn through the pipe 89 and pipe 88, across the valve 85 and into the cylinder 77 back of the piston 81. All the stems 85a, 94a and 98a, 103a of the valves 85, 94 and 98, 103 are square in cross-section giving clearance above the valves within the cylinder. At the same time, the valve 94 closes off the passage 97 and no flow is had through the pipe 93.

In the other valve head, Fig. 6, travel of the piston 81 to the right, creates sufficient pressure to lift the valve 103 and allow the medication previously introduced on the right of the piston 81 to be forced out through the pipe 108 and into the discharge line 49, and the valve 98 is closed under pressure induced to the right of the piston 81.

Upon reverse travel of the piston 81 toward the left, a vacuum is tended to be set up in the valve chamber 99, lifting the valve 98 to draw the medication liquid from the pipe 102 into the cylinder 77. The valve 103 is pulled closed by the reduced pressure. At the other cylinder end now under pressure, the valve 94 is opened for discharge of the medication to the pipe 49, and the valve 85 is closed.

That is the normal, continuous action of the device. Since both the water motor and the medication pump are positive displacement devices, the proportioning of the medication to the water flowing in the pipe 49 may be held to the exact proportioning desired, and as determined by the slide 120 position along the bar 113. The stored up energy in the springs 69 and 71 and the energy release means insure that positive, uniform, and accurate proportioning.

Now in case, due to any unforeseen reason, of the motor failing to operate, such as breakage of the springs 69 and 71, the spring urged valves 19, 20 and 21 and 22 will all come to open positions positioning the plate 33 horizontally and thereby permit a continuous flow of water past those valves and out the pipe 49. Therefore, there will be insured a water supply for watering the chickens or stock, lack of which could be fatal particularly for chickens, even though no medicinal preparation would be added thereto.

A downwardly extending pin 135 is fixed to a collar 136 and travels to and fro with the piston rod 16, Fig. 4. Upon reciprocation of the piston rod 16, the pin 135 contacts rod 137, in turn swinging arm 138 of a counter or odometer 139 to indicate and record the number of strokes of the piston 15.

Therefore, while I have herein described my invention in the one specific form now best known to me, it is obvious that structural deviations therefrom may be employed without departing from the spirit of the invention, and I therefore do not desire to be limited to that precise form beyond the limitations which may be imposed by the following claims.

I claim:

1. A pressurized flow actuated motor comprising a cylinder; a piston in the cylinder; a piston rod extending from said piston and externally of the cylinder; a pair of fluid inlet valves intercepting respectively separate inlet passageways to respective outer ends of said cylinder; a pair of exhaust valves intercepting respective cylinder exhaust passageways; an operating member on each of said valves; a rock member actuating all of said operating members; said rock member being pivotally mounted adjacent said operating members to have an inlet valve for one end of the cylinder and an exhaust valve for the opposite cylinder end in the path of said rock member on one side of its pivot mounting; and the operating members for the other two valves in the path of said rock member on its other side of the pivot mounting; an arm rocking said rock member; a bar reciprocably mounted; means on said bar straddling said arm and rocking said member and in turn actuating said valves upon bar reciprocation; spring means individually tending to close each valve separately and react on said rock member, tending to rock it and said bar to a neutral position whereby all of said valves are positioned by said springs in open positions by reason of said valve operating members bearing on said rock member approximately equally on each side of said pivot mounting, permitting said flow to pass through said open inlet valves into opposite cylinder ends and out through said open exhaust valves; and means actuating said bar to opposite ends of travel; means releasably retaining the bar at said ends of travel.

2. The structure of claim 1 in which there is a crosshead on said piston rod; said bar travel actuating means comprising an extension of the bar passing shiftably through said head, a pair of bar actuating springs, one each on said extension on respective sides of said crosshead, abutments in the paths of said springs causing those springs to be compressed upon said crosshead upon alternate travel of said piston rod in turn tending to shift said bar under pressure generated by that compression, and trigger means selectedly holding and releasing said bar for travel under the influence of said pressure of the bar actuating springs.

3. The structure of claim 2 in which there are trigger means for releasably retaining the crossbar in opposite ends of travel set up by said actuating springs, said trigger means comprising fingers in spaced relation along the bar, a pair of abutments of opposing rounded surfaces in each instance carried by the bar; a pair of spaced apart trigger fingers each rockably mounted on bearings fixed in relation to bar travel and having rounded surfaces opposing said first rounded surfaces of the bar, said bar springs alternately moving said bar surfaces into approximately tangential contact with the trigger surfaces, and means reciprocated by said piston rod to trip said fingers for release over said surfaces.

References Cited in the file of this patent

UNITED STATES PATENTS

| | | |
|---|---|---|
| 464,361 | Hodgson | Dec. 1, 1891 |
| 1,137,861 | Johnson | May 4, 1915 |
| 1,870,897 | Davis | Aug. 9, 1932 |
| 2,135,011 | McGauchie | Nov. 1, 1938 |
| 2,203,832 | Malburg | June 11, 1940 |
| 2,366,523 | Haig | Jan. 2, 1945 |
| 2,497,348 | Ecker | Feb. 14, 1950 |